July 2, 1963 R. F. STEWART 3,096,442

LIGHT SENSITIVE SOLID STATE RELAY DEVICE

Filed Jan. 2, 1959

INVENTOR

Richard F. Stewart

BY Stevens, Davis, Miller & Mosher

ATTORNEYS

United States Patent Office 3,096,442

Patented July 2, 1963

3,096,442

LIGHT SENSITIVE SOLID STATE RELAY DEVICE

Richard F. Stewart, Richardson, Tex., assignor to Texas Instruments Incorporated, Dallas, Tex., a corporation of Delaware Filed Jan. 2, 1959, Ser. No. 784,742
6 Claims. (Cl. 250—211)

This invention relates to a semiconductor gating device operating functionally as the equivalent of the electromechanical relay.

The well-known electromechanical relay serves the function of selectively connecting or disconnecting a circuit. The relay is not often suitable in electronic circuitry, however, because it is slow acting, requires a large amount of power and is subject to wear. The electronic industry has developed many circuits to be used instead of the relay to accomplish the function of selectively connecting or disconnecting a circuit. All of these circuits are known generally as electronic gates. These electronic gates of the prior art require very little power compared to the relay, are extremely faster acting than the relay, and are not subject to wear. Yet the relay has one important advantage which is not enjoyed by the electronic gates of the prior art. In the relay, the controlling circuit is completely isolated from the controlled circuit whereas in the electronic gates this is not the case.

The device according to the present invention performs the function of selectively connecting and disconnecting a circuit just as fast, and takes as little power to operate as the electronic gates of the prior art, is not subject to wear like the electronic gates of the prior art, and yet the controlling circuit is completely isolated from the controlled circuit.

Briefly, according to the present invention, a PNPN transistor is triggered with light emitted from an electroluminescent layer positioned near the junctions of the PNPN transistor. The electroluminescent layer has a voltage applied thereto so that some light is always emitted. When this voltage is changed to increase the light intensity, the PNPN transistor is put in a low resistance state which is the equivalent of a relay with closed contacts. When the voltage is changed to decrease the light intensity, the PNPN transistor is put in a high resistance state which is the equivalent of a relay with its contacts open. This device permits complete electrical isolation of the controlled circuit from the controlling circuit. The power required to control the device is small because the PNPN transistor provides power gain. The time required for switching action is very short because there is no time lag due to winding inductance or inertia of moving parts. There is virtually no wear as there are no moving parts and no opening and closing contacts to corrode.

Further objects and advantages of the invention will become apparent as the following description of a preferred embodiment of the invention unfolds and when taken in conjunction with the drawings in which.

Figure 1:
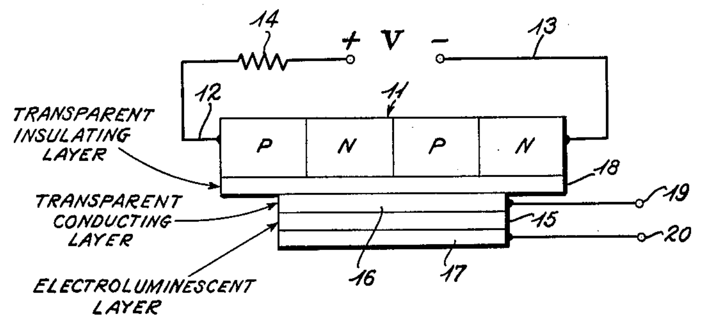
FIGURE 1 is a schematic illustration of the device.

As shown in FIGURE 1, the device of the invention comprises a PNPN transistor 11. The PNPN transistor has alternate layers of p-type and n-type semiconductor material. Transistors of this type are described in full in the text entitled Transistor Technology, volume Two of the Bell Laboratories Series, edited by F. J. Biondi and published by D. Van Norstrand Company, Inc., on pages 438 to 454. Electrodes 12 and 13 are positioned on the end p-type and n-type layers, respectively, of the PNPN transistor 11. A resistor 14 is connected to the electrode 12. A D.C. bias voltage is applied across the series circuit of the PNPN transistor 11 and the resistor 14. The polarity of the applied bias voltage is such that the minus side of the voltage is connected to the electrode 13 and the positive side of the voltage is connected to the electrode 12 through the resistor 14. A layer 15 of electroluminescent material is positioned so that light emitted by the layer 15 will irradiate the junctions of the PNPN transistor 11. The layer 15 is sandwiched between two layers 16 and 17 of conductive material, which make electrical contact with the layer 15. The layer 16 is positioned between the layer 15 and the PNPN transistor and is transparent so that the light emitted by the electroluminescent layer 15 will pass through the layer 16 to irradiate the junctions of the PNPN transistor 11. A layer 18 made of transparent insulating material is sandwiched between the transparent layer 16 and the PNPN transistor 11. Thus the layers 15, 16, and 17 are insulated from the PNPN transistor 11. A pair of terminals 19 and 20 are connected to the conductive layers 16 and 17 respectively. By applying a voltage across the terminals 19 and 20, an electric potential will be applied across the layer 15 of electroluminescent material and thus cause this layer to emit light. In the operation of the device, a reference voltage will be applied across the terminals 19 and 20 to cause the layer 15 to continuously emit light. This light will pass through the transparent layers 16 and 17 and irradiate the junctions of the PNPN transistor 11. When the voltage applied to terminals 19 and 20 is increased, the light emitted by the layer 15 will increase, and when the voltage applied to the terminals 19 and 20 is decreased, the light emitted by the layer 15 will decrease. When the light irradiating the junctions of the PNPN transistor 11 is increased, the PNPN transistor 11 will go into a low resistance state. When the light irradiating the junctions of the PNPN transistor 11 decreases, the PNPN transistor 11 will go into a high resistance state. Thus by controlling the voltage applied to the terminals 19 and 20, the resistance between the electrodes 12 and 13 may be effectively controlled to be either a high resistance or a low resistance. The value of the high resistance and the value of the low resistance is such that in effect it is the same as if a switch between the electrodes 12 and 13 were opened or closed.

Figure 2:
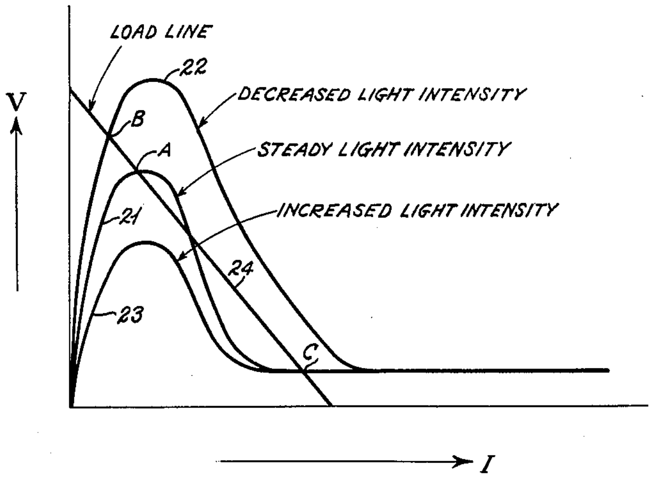
FIGURE 2 shows the operational characteristics of the device.

An explanation of how the PNPN transistor is switched from a high resistance state to a low resistance state is given below with reference to FIGURE 2, which shows the voltage-current characteristics of the PNPN transistor 11. The three curves 21, 22, 23 are the characteristics of the PNPN transistor 11 with different amounts of light irradiating the junctions of the PNPN transistor. The curve 21 is the characteristic obtained with light of intermediate intensity irradiating the junctions of the PNPN transistor and the curve 22 is the characteristic obtained with light of a lesser intensity irradiating the junctions of the PNPN transistor and the curve 23 is the characteristic obtained with light of a greater intensity irradiating the junctions of the PNPN transistor.

The reference voltage applied to the terminals 19 and 20 is chosen so that the light irradiating the junctions of the PNPN transistor 11 emitted by the layer 15 will have an intensity such as to cause the characteristic 21 to be obtained. When the voltage across the terminals 19 and 20 is decreased, the light emitted by the layer 15 will decrease and the characteristic 22 will be obtained. When the voltage across terminals 19 and 20 is increased from the reference value the light emitted by the electroluminescent layer 15 will increase and the characteristic 23 will be obtained. The resistance of resistor 14 and the voltage applied across the series circuit of the resistor 14 and the PNPN transistor 11 are chosen such that the load line designated 24 in FIGURE 2 is obtained. This load line intersects the characteristic 21 at point A. Therefore, with the reference voltage alone applied across terminals 19 and 20, the PNPN transistor 11 may operate on the characteristic 21 at point A. If, when the PNPN transistor is operating at point A, and the voltage across terminals 19 and 20 is increased from the reference voltage so as to obtain the characteristic 23, the operation point of the PNPN transistor 11 will switch to the intersection of the load line 24 and the characteristic 23. This intersection is designated point C in FIGURE 2. The D.C. resistance of the PNPN device at point C as determined by the total voltage divided by the total current, it will be seen is quite low. Also the A.C. resistance as determined by $dV/dI$ is quite low at point C. Thus the PNPN transistor 11 will be in both a low A.C. and D.C. resistance state at point C. If after the voltage across terminals 19 and 20 is increased to obtain the characteristic 23, the voltage is then again decreased to the reference value. The point of operation of the PNPN transistor 11 will remain at point C as the load line intersects the characteristic 21 at point C also, and therefore the A.C. and D.C. resistance will remain low. If the voltage across terminals 19 and 20 is decreased so as to obtain characteristic 22, the point of operation of the PNPN transistor 11 will switch to the intersection of the load line 24 and the characteristic 22. This intersection is designated point B in FIGURE 2. It will be observed that the D.C. resistance of the PNPN transistor 11 at point B as determined by the total voltage divided by the total current is high, and the A.C. resistance at point B as determined by $dV/dI$ is also high. Thus with a decreased voltage across terminals 19 and 20 so as to produce characteristic 22, the A.C. and D.C. impedance of the PNPN transistor 11 will be high. If, after the voltage across terminals 19 and 20 is decreased so that the operation point of the PNPN transistor 11 switches to point B, the voltage is then again increased to the reference voltage, the operation point will switch back to point A.

Thus there is obtained a device which will selectively connect or disconnect a circuit and which requires as little power as the electronic gate, is as little subject to wear as the electronic gate, and operates as fast as the electronic gate and yet in which the controlled circuit is completely isolated from the controlling circuit.

In the preferred embodiment the layers 16 and 18 have been described as being transparent. However, one or both of these layers may be translucent. It is only necessary for operation that they be light transmitting although best operation will be obtained if they are transparent.

The above description is of a preferred embodiment of the invention and many modifications can be made thereto without departing from the spirit and scope of the invention which is limited only as defined in the appended claims.

What is claimed is:

1. A solid state relay device comprising a PNPN transistor, a layer of electroluminescent material positioned to irradiate the junctions of said PNPN transistor with light emitted by said layer of electroluminescent material, a layer of electrically conducting and light transmitting material making contact with said layer of electroluminescent material and positioned between said layer of electroluminescent material and said PNPN transistor, a layer of insulating and light transmitting material sandwiched between said PNPN transistor and said layer of electrically conducting and light transmitting material, and a layer of electrically conducting material making contact with said layer of electroluminescent material on the opposite side from said layer of electrically conducting and light transmitting material.

2. A solid state relay device comprising a PNPN transistor, a layer of electroluminescent material positioned to irradiate the junctions of said PNPN transistor with the light emitted by said layer of electroluminescent material, means to apply a variable voltage across said electroluminescent layer including a layer of electrically conducting and light transmitting material in contact with said layer of electroluminescent material positioned between said layer of electroluminescent material and said PNPN transistor, and a layer of insulating and light transmitting material sandwiched between said PNPN transistor and said layer of electrically conducting and light transmitting material.

3. A solid state relay device comprising a PNPN transistor, a layer of electroluminescent material positioned to illuminate the junctions of said PNPN transistor with the light emitted by said layer of electroluminescent material, and means to apply a variable voltage across said layer of electroluminescent material, said last named means including a layer of electrically conducting and light transmitting material in contact with said layer of electroluminescent material and positioned between said PNPN transistor and said layer of electroluminescent material.

4. A solid state relay device comprising a PNPN transistor, a layer of electroluminescent material positioned to illuminate the junctions of said PNPN transistor with the light emitted by said layer of electroluminescent material, a layer of light transmitting insulating material positioned between said PNPN transistor and said layer of electroluminescent material, and means to apply a variable voltage across said layer of electroluminescent material.

5. A unitary solid state relay device comprising a PNPN diode, a layer of electroluminescent material positioned to illuminate the diode in the region adjacent the intermediate P–N junction thereof with the light emitted by said layer of electroluminescent material, a layer of light-transmitting insulating material positioned between said PNPN diode and said layer of electroluminescent material, and means to apply a variable voltage to said layer of electroluminescent material.

6. A unitary solid state switching device comprising a PNPN diode, electroluminescent means positioned to illuminate the diode in the region adjacent the intermediate P–N junction thereof with light emitted by the electroluminescent means, light-transmitting insulating means positioned between the diode and the electroluminescent means, the insulating means and the electroluminescent means being arranged in a laminar structure contiguous to one another so that an integrated unit is provided, and electrically-conductive means connected to the electroluminescent means effective to apply a variable voltage thereto.

References Cited in the file of this patent

UNITED STATES PATENTS

| | | |
|---|---|---|
| 2,735,049 | De Forest | Feb. 14, 1956 |
| 2,776,367 | Le Hovec | Jan. 1, 1957 |
| 2,790,088 | Shive | Apr. 23, 1957 |
| 2,791,761 | Morton | May 7, 1957 |
| 2,820,926 | Kennedy et al. | Jan. 21, 1958 |
| 2,932,746 | Jay | Apr. 12, 1960 |
| 2,944,165 | Stuetzer | July 5, 1960 |

OTHER REFERENCES

Moll et al.: Proceedings of the IRE, vol. 44, Sept. 19, 1956, pp. 1174–1182.

Bramley et al.: Article in "The Role of Solid State Phenomena in Electric Circuits," Polytechnic Institute of Brooklyn, Brooklyn, N.Y., 1957, pp. 289–301.

IRE Standards on Solid State Devices, Proceedings of the IRE, October 1960, pp. 1772–1775.